Jan. 10, 1956 A. G. BUHR 2,730,031
WRENCH TYPE CLAMP
Filed Oct. 17, 1951

DRAFT INDUCED FORCE

Inventor
August G. Buhr
by Kimball S. Wyman
Attorney

United States Patent Office 2,730,031
Patented Jan. 10, 1956

2,730,031

WRENCH TYPE CLAMP

August G. Buhr, La Crosse, Wis., assignor to Allis-Chalmers Manufacturing Company, Milwaukee, Wis.

Application October 17, 1951, Serial No. 251,789

2 Claims. (Cl. 97—198.1)

This invention relates generally to a means for attaching parts or structures to a bar and particularly to a clamp for rigidly and detachably mounting parts or structures on a support bar as, for example, the mounting of agricultural implements on the draft bar of a tractor.

Although this invention is not limited to agricultural implements, one of the purposes for which it is ideally suited is the mounting of ground working tools on a draft bar of a tractor. When ground working tools are mounted on a tractor, the clamp employed to secure the implements to a support or draft bar is subject to two types of forces. One of these forces is the result of tension in the bolts of the clamp required to hold the implement on the bar. The other type of force is that transmitted to the clamp bolts when the implement is engaged with and operated in the ground. This latter type force fluctuates greatly as the applied load to the implement varies from that obtained in normal ground working conditions to that imposed when rocks or other obstructions in the ground are encountered. This force may be sufficient to cause bolt loosening and/or failure and makes it desirable to employ a clamp which is subject to minimum bolt loads and bolt load fluctuations.

The clamps in common use at the present time are of either the cap type or the clamp bolt type. The latter type may make use of U-bolts, L-bolts, or a combination of machine and eye bolts while the former type makes use of a cap held in place by a pair of bolts. Although distinct advantages are claimed for each of these types, they also have disadvantages. For example, the cap type is relatively expensive and the clamp bolt type utilizes bolt arrangements which undergo variable loads in addition to the original bolt tension required to hold the clamp on the bar. This additional load requires the use of large expensive bolts which must be frequently replaced due to stretching and breakage.

The principal object of this invention is to provide an improved clamp which affords the advantages of the cap and bolt type clamps which are in present use without embodying their disadvantages.

Another object of this invention is to provide an implement clamp which subjects the retaining bolts to only those tension forces required to hold the clamp in place on a support bar thereby eliminating the bolt loosening and breakage caused by a transmission of draft induced forces thereto.

A further object of this invention is to provide a clamp which can be readily attached to or removed from a support bar, as desired, and which requires only a few simple parts and is therefore simple and economical to manufacture.

The above objects and others will be apparent from a consideration of the following detailed description, reference being had to the accompanying drawings, in which.

Figure 1:
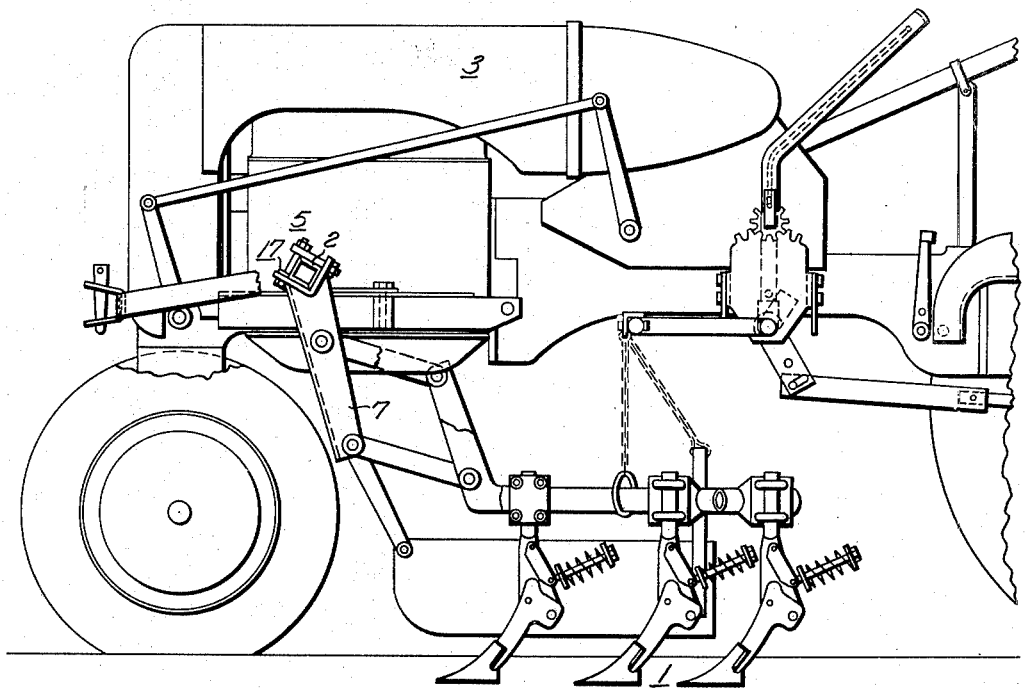
Fig. 1 is a partial side elevation of a tractor mounted implement incorporating a clamp embodying the invention.

For illustrative purposes, the present invention is shown in Fig. 1 as being used in conjunction with the mounting of implements 1 on a transversely disposed draft bar 2 of a conventional farm tractor 3, the implements being fixed to bar 2 by means of a mounting standard which includes a clamp 5 and link 7.

Figure 2:
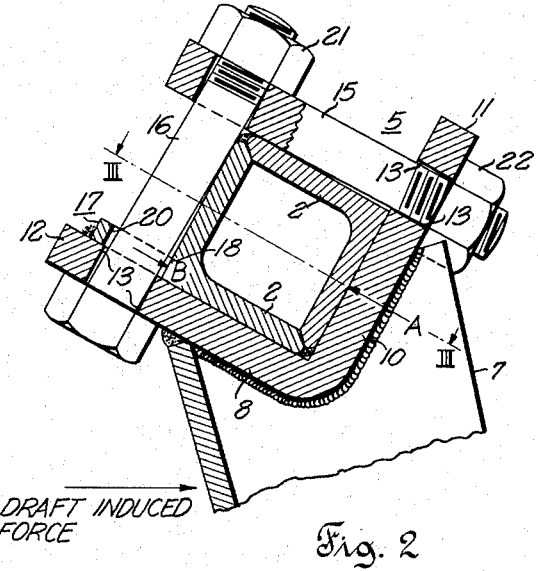
Fig. 2 is an enlarged side elevation of the bar and clamp combination shown in Fig. 1 with the clamp shown in section to better illustrate the coaction of the various parts and with arrows applied to indicate an application of the forces involved.

The clamp 5 comprises an angle shaped element presenting plate members or legs 8 and 10 which intersect at a right angle and have their outer surfaces rigidly secured as by welding to the upper end of an upstanding arm or implement link 7. The junctioned inner plane surfaces of the legs are complementary to and abut a pair of the adjoining side surfaces of the draft bar 2 which is rectangular in cross section. The length of the legs 8 and 10, as viewed in Fig. 2, is greater than the corresponding dimensions of the sides of bar 2 and consequently extend therebeyond and present projecting portions. The projections 11 and 12 have bolt receiving apertures 13 extending therethrough.

Figure 3:
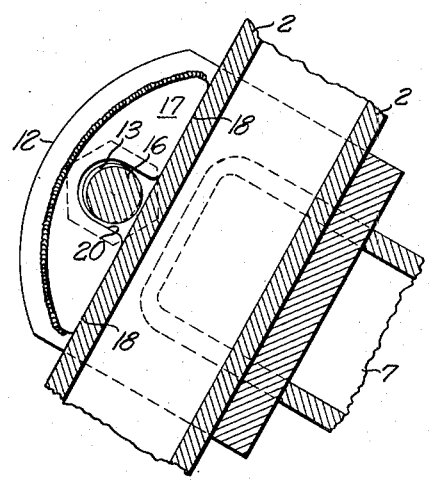
Fig. 3 is a sectional view of the clamp and bar structure taken on line III—III of Fig. 2.

A tab 17 is rigidly secured as by welding to the inner surface of projecting portion 12 so as to present a side surface 18 which is perpendicular to the inner surface to which it is secured. The side surface 18 is recessed to provide a bolt receiving slot 20 (note Fig. 3) which is aligned with the aperture 13 in projecting portion 12.

An eye bolt 15 passes through the aperture 13 in projecting portion 11 and a machine bolt 16 passes through the eye of bolt 15 and through the aligned slot 20 and aperture 13 of projecting portion 12. The eye bolt end of machine bolt 16 is provided with a nut 21 and the opposite end of eye bolt 15 is provided with a nut 22. Upon tightening these nuts the bolts 15 and 16 are tensioned to hold inner plane surfaces of legs 8 and 10 in firm abutting relation against the opposed adjoining side surface of the draft bar 2. It will be noted that legs 8 and 10 and the bolts 15 and 16 present sides of a contractable loop structure.

Referring again to Fig. 1, when the implement 1 is engaged with the ground and the tractor 3 is driven forward, a force is applied to the upstanding part or link 7 which tends to turn or rotate the angle shaped element of the clamp in a counterclockwise direction about the rigid draft bar 2. However, any such relative turning or rotation is prevented by the side surface 18 of tab 17 which abuts the opposing side surface of draft bar 2. In addition, this coaction of tab 17 prevents any of the working load imposed on part 7 by the implement attached thereto from being transmitted to the bolts 15 and 16.

This is an important feature and is accomplished by a construction wherein inner plane surfaces of legs 8 and 10 and the tab surfaces 18 are in contact with three side surfaces of the draft bar 2 so that a wrench like effect which may be represented as an application of forces A and B to bar 2 is obtained when a draft induced load is applied to the part 7. Consequently, draft induced loads including shock loads due to ground obstructions encountered by the implement and which impose a torque load upon the draft bar 2 are absorbed entirely by the coaction of legs 8, 10 and tab 17 thereby preventing bolts 15 and 16 from being subjected to any forces in addition to the original tension forces required to hold the clamp element in place on the bar 2. As a result, the elimination of bolt loosening and/or breakage is accomplished by means of a simplified construction affording material advantages as to cost and as to ease of attachment, adjustment and removal.

It will now be noted that there has been provided a combination of parts wherein a tool mounting standard is positioned on the draft bar 2 so that when the tools 1 are engaged with the ground and propelled forwardly the link 7 of the standard tends to swing rearwardly about a line of contact between the surface of the plate 10 and one corner of the bar 2 and that such movement is restrained by a tab 17 which projects from the surface of the plate 8 in proximity to another corner of the bar 2 which is diagonally opposite to the one corner mentioned above. The standard 7, 8, 10, 17 is held in position on the bar 2 by clamping means including bolts 15 and 16 which are independent of the tab 17 and which are connected with each other and with the bar to hold the standard on the bar with the surfaces of plates 8 and 10 and tab 17 in load transmitting engagement with the bar.

It is to be understood that the embodiment of the invention herein shown and described is for the purposes of illustration, rather than limitation, and that the present invention is to be considered as including all modifications and applications which may fairly fall within the scope of the appended claims.

It is claimed and desired to secure by Letters Patent:

1. In an agricultural implement, the combination of a mobile support, an earth working tool, and connecting means between said support and said tool operative to advance the latter in ground engaging condition upon propulsion of said support, said connecting means comprising a draft bar of rectangular cross section extending transversely of said support and secured thereto against torsional displacement about its axis, a mounting standard for said earth working tool extending transversely of said draft bar and having a pair of relatively diverging surfaces at right angles to each other and in face to face engagement, respectively, with contiguous longitudinally extending side surfaces of said draft bar so that upon said advancement of said tool said mounting standard will tend to swing rearwardly about a line of contact between one of said relatively diverging surfaces and an adjacent first corner portion of said draft bar, a tab member secured to said standard and projecting from the other of said relatively diverging surfaces in proximity to a corner of said draft bar diagonally opposite to said first corner and bearing against said draft bar so as to positively restrain said rearward swinging movement of said standard, and releasable clamping means independent of said tab member adjustably connected with said standard and cooperating with said draft bar for securing said standard against separation from said draft bar transversely of the latter.

2. In an agricultural implement, the combination set forth in claim 1 wherein said releasable clamping means comprise a pair of interconnected bolt elements extending, respectively, through said relatively diverging surfaces of said standard.

References Cited in the file of this patent

UNITED STATES PATENTS

| | | |
|---|---|---|
| 174,251 | Jacobus et al. | Feb. 29 1876 |
| 469,659 | Clark | Feb. 23, 1892 |
| 520,002 | Kirlin | May 15, 1894 |
| 821,082 | Brillhart | May 22, 1906 |
| 2,155,739 | Seaholm | Apr. 25, 1939 |
| 2,557,443 | Leonard | June 19, 1951 |
| 2,562,486 | Denning | July 31, 1951 |